United States Patent Office 3,406,237
Patented Oct. 15, 1968

3,406,237
COMPOSITION AND A METHOD FOR RELIEVING BRONCHO-SPASMS WHICH USE 1-p-HYDROXY-PHENYL - 2 - (β - 3',5' - DIHYDROXYPHENYL - β-HYDROXY)-ETHYLAMINOPROPANE
Karl Zeile, Otto Thomä, and Anton Mentrup, Ingelheim am Rhein, Germany, assignors to Boehringer Ingelheim G.m.b.H., Ingelheim am Rhein, Germany, a corporation of Germany
No Drawing. Original application Nov. 27, 1963, Ser. No. 326,398, now Patent No. 3,341,593, dated Sept. 12, 1967. Divided and this application July 25, 1967, Ser. No. 655,747
Claims priority, application Germany, Nov. 30, 1962, B 69,820
3 Claims. (Cl. 424—45)

ABSTRACT OF THE DISCLOSURE

The composition contains a 1-p-hydroxyphenyl-2-(β-3',5'-dihydroxyphenyl-β - hydroxy) - ethylamino-propane as an active broncho-spasmolytic ingredient.

This is a division of copending application Ser. No. 326,398, filed Nov. 27, 1963, now U.S. Patent 3,341,593 issued Sept. 12, 1967.

This invention relates to a novel broncho-spasmolytic composition, as well as to a novel method of treating broncho-spasms in warm-blooded animals.

More particularly, the present invention relates to a pharmaceutical composition comprising as an active ingredient a racemic mixture of the compound of the formula

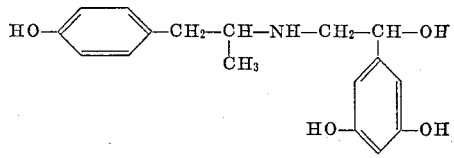

(I)

an optical antipode thereof, a stereoisomer thereof, or a non-toxic, pharmacologically acceptable acid addition salt of said racemic mixture, optical antipode or stereoisomer.

The compound of the Formula I above may be prepared by various different methods which involve well known chemical reaction principles. However, the following methods have been found to be particularly convenient and efficient:

Method A

Reduction of a ketone of the formula

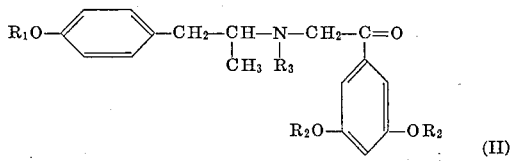

(II)

wherein $R_1$ and $R_2$ are hydrogen or protective groups which may readily be split off again by hydrolysis, hydrogenolysis or alcoholysis during or subsequent to the reduction, preferred such protective groups being acyl or benzyl; and $R_3$ is hydrogen or a protective group for the amino group which can readily be split off again during or subsequent to the reduction, preferably benzyl.

The reduction of the ketone II is preferably carried out by catalytic hydrogenation in the presence of platinum, palladium or nickel as a catalyst, whereby not only the keto group is converted into a hydroxyl group, but protective groups removable by hydrogenolysis, such as benzyl, are also simultaneously removed. In the event that $R_1$ and/or $R_2$ are acyl, they remain unaffected by the catalytic hydrogenation of the keto group and may subsequently be removed by hydrolysis or alcoholysis in customary fashion.

The reduction of the keto group may also be effected by reaction of the ketone II with an alkali metal borohydride, preferably sodium borohydride.

The ketones II, which are used as starting materials in this method, may themselves be prepared by the following procedures:

(1) Reaction of a bromoketone of the formula

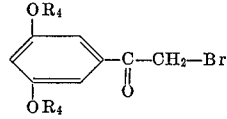

(III)

wherein $R_4$ is hydrogen or a hydrogen-protective group, such as methyl, benzyl or preferably acyl, with an amine of the formula

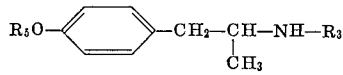

(IV)

wherein $R_3$ is hydrogen or an amino-protective group, such as benzyl which is preferred, and $R_5$ is hydrogen or a hydroxy-protective groups, such as acyl, methyl or benzyl, and removal of the hydroxy- and amino-protective groups, if necessary.

(2) Reductive alkylation of an amine of the formula

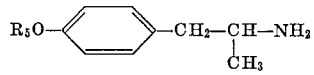

(V)

wherein $R_5$ has the same meanings as in Formula IV above, with a keto-aldehyde of the formula

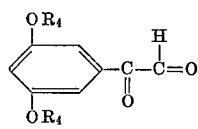

(VI)

wherein $R_4$ has the same meanings as in Formula III above, and removal of the amino- and hydroxy-protective groups, if necessary.

(3) Formation of the Schiff's base from the amine V and the keto-aldehyde VI, and subsequent hydrogenation while maintaining the ketone group, the hydrogenation being preferably performed catalytically, and removal of the amino- and hydroxy-protective groups if necessary.

The sequence of the removal of the amino-protective group $R_3$, the hydroxy-protective group $R_4$ and/or $R_5$ and the reduction of the ketone group may be varied, depending upon the procedures for removal of the protective groups. If it is necessary for the removal of one or the other protective group to treat the intermediate compound with a hydrohalic acid, for instance, with hydrobromic acid in the case of the removal of the methyl group in the $R_4$ and/or $R_5$ position, this removal is advantageously performed prior to the reduction of the ketone group.

Method B

Reductive alkylation of a compound of the formula

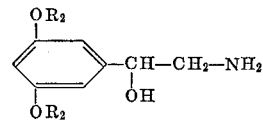

(VII)

wherein $R_2$ has the same meanings as defined in Formula II, with a ketone of the formula

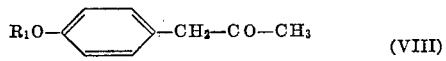 (VIII)

wherein $R_1$ has the same meanings as the Formula II.

The customary hydrogenation catalysts, such as palladium, platinum or nickel, may be used as catalysts for the reductive alkylation. The protective groups $R_1$ and $R_2$ may be removed simultaneously during the reductive alkylation or also subsequent thereto. The aminoalcohols VII may, for example, be obtained from the corresponding bromo-ketones by reaction with sodium phthalimide, saponification and reduction of the ketone.

Method C

Formation of the Schiff's base from the amine VII and the ketone VIII, and subsequent hydrogenation, which is advantageously performed catalytically.

The compound of the Formula I above contains two asymmetric carbon atoms and therefore occurs in two stereoisomeric forms A and B, which may be separated from each other by customary methods. Each of these stereoisomers, in turn, occurs in the form of d,l-racemates which may again be separated into their optically active d- and l-isomers by known methods.

The following examples further illustrate the present invention and will enable others skilled in the art to understand it more completely.

Example 1.—Preparation of 1-p-hydroxyphenyl-2-($\beta$-3',5'-dihydroxyphenyl - $\beta$ - hydroxy)-ethylamino-propane by Method A (a) 1-p-hydroxyphenyl-2-($\beta$-3',5' - dihydroxy - phenyl-$\beta$-oxo)-ethylamino-propane hydrobromide.—441 gm. (1.4 mols) of 3,5-acetoxy-$\alpha$-bromo-acetophenone (M.P. 66° C.), prepared by bromination of 3,5-diacetoxy-acetophenone, were added to a solution of 714 gm. (2.8 mols) of 1-p-methoxyphenyl-2-benzylamino-propane in 1000 cc. of benzene, and the resulting solution mixture was refluxed for one hour. The molar excess of 1-p-methoxyphenyl-2-benzylamino-propane precipitated out as its hydrobromide. After separation of the precipitated hydrobromide of the amino component, the hydrochloride of 1-p-methoxyphenyl-2-($\beta$-3',5'-diacetoxyphenyl - $\beta$ - oxo)-ethyl-benzylamino-propane was precipitated from the reaction solution by addition of an ethanolic solution of hydrochloric acid. The precipitate was separated and, without further purification, was de-acetylated by boiling it in a mixture of 2 liters of aqueous 10% hydrochloric acid and 1.5 liters of methanol. The resulting solution was filtered through animal charcoal and, after addition of 2 liters of methanol, it was de-benzylated by hydrogenation at 60° C. over palladized charcoal as a catalyst. After removal of the catalyst by filtration, the filtrate was concentrated by evaporation, whereupon the hydrochloride of 1-p-methoxyphenyl-2-($\beta$-3',5'-dihydroxyphenyl-$\beta$-oxo)-ethylamino-propane (M.P. 244° C.) crystallized out. For the purpose of demethylation, the 350 gm. of the hydrochloride thus produced were refluxed for two hours with 3.5 liters of aqueous 48% hydrobromic acid. Upon cooling of the reaction solution, 320 gm. of 1-p-hydroxyphenyl-2-($\beta$ - 3',5' - dihydroxyphenyl-$\beta$-oxo)-ethylamino-propane hydrobromide (M.P. 220° C.) crystallized out. (b) 100 gm. of the 1-p-hydroxyphenyl-2-($\beta$-3',5'-dihydroxyphenyl-$\beta$-oxo) - ethylamino - propane hydrobromide obtained in the previous step were dissolved in hot water, and the aminoketone was isolated as the difficulty soluble sulfate by addition of an aqueous potassium sulfate solution. For the purpose of hydrogenating the keto group, 35 gm. of 1-p-hydroxyphenyl-2-($\beta$-3',5'-dihydroxyphenyl-$\beta$-oxo) - ethylamino - propane sulfate were dissolved in a mixture of 100 cc. of methanol and 100 cc. of water. After addition of a small amount of hydrochloric acid, palladium chloride and activated charcoal, the mixture was hydrogenated at 50–70° C. and at 5 atmospheres gauge. After removal of the catalyst by vacuum filtration, the filtrate was evaporated to dryness in vacuo, whereby 1-p-hydroxyphenyl-2-($\beta$-3',5'-dihydroxyphenyl-$\beta$-hydroxy)-ethylamino-propane sulfate was obtained. The free base of the formula

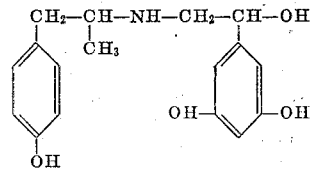

was obtained from the sulfate by addition of an aqueous sodium bicarbonate solution and shaking of the mixture with ethylacetate. The hydrochloride of this compound (M.P. 182–183° C.) was obtained by adding an ethereal solution of hydrochloric acid to the free base.

Example 2.—Preparation of 1-p-hydroxyphenyl-2-($\beta$-3',5'-dihydroxy-phenyl-$\beta$-hydroxy)-ethylamino-propane hydrobromide by Method A 220 gm. of 1-p-hydroxyphenyl-2-($\beta$-3',5'-dihydroxyphenyl-$\beta$-oxo)-ethylamino-propane hydrobromide were dissolved in 1 liter of methanol, the resulting solution was boiled with activated charcoal, the charcoal was filtered off and the filtrate was hydrogenated in the presence of Raney nickel at 60° C. and 5 atmospheres gauge. Thereafter, the catalyst was filtered off, the methanolic solution was admixed with a small amount of concentrated hydrobromic acid, and the mixture was evaporated to dryness in vacuo. The residue was stirred with acetone, the mixture was vacuum filtered and the filter cake was recrystallized from a mixture of methanol and ether. The 1-p-hydroxyphenyl-2-($\beta$-3',5'-dihydroxyphenyl-$\beta$-hydroxy)-ethylamino-propane hydrobromide thus obtained had a melting point of 222–223° C.

Analysis.—Calculated: Br, 20.79%; N, 3.65%. Found: Br, 20.85%; N, 3.66%.

Example 3.—Preparation of 1-p-hydroxyphenyl-2-($\beta$-3',5'-dihydroxyphenyl-$\beta$-hydroxy)-ethylamino - propane and its hydrochloride by Method B A mixture of 8.45 gm. (0.05 mol) of 1-(3',5'-di-hydroxyphenyl)-1-hydroxy-2-amino-ethane and 9 gm. (0.06 mol) of p-hydroxyphenyl acetone was added to 150 cc. of methanol, 3 gm. of glacial acetic acid were added thereto, and the resulting mixture was hydrogenated in the presence of platinum under normal conditions. After the absorption of hydrogen was complete, the catalyst was removed by vacuum filtration, an aqueous sodium bicarbonate solution was added to the filtrate and the 1-p-hydroxyphenyl-2-($\beta$-3',5'-dihydroxyphenyl - $\beta$ - hydroxy)-ethylamino-propane formed thereby was taken up in ethyl acetate. The addition of an ethereal solution of hydrochloric acid to this ethyl acetate solution led to the precipitation of the hydrochloride of the base, which crystallized upon treatment with a mixture of acetonitrile and ether (M.P. 183° C.).

Example 4.—Separation of the hydrobromide of 1-p-hydroxyphenyl-2-($\beta$-3',5'-dihydroxyphenyl - $\beta$ - hydroxy)-ethylamino-propane into its stereoisomeric components 360 gm. of the 1-p-hydroxyphenyl-2-($\beta$-3',5'-dihydroxyphenyl-$\beta$-hydroxy)-ethylamino - propane hydrobromide obtained in Example 2 were recrystallized several times from glacial acetic acid. 180 gm. of the stereoisomeric form A of the hydrobromide were obtained, which had a melting point of 224.5–226° C.

The stereoisomeric form B of the hydrobromide, which had a melting point of 188–190° C., was obtained by treating the concentrated mother liquors of the glacial acetic acid recrystallization step with acetonitrile.

The compounds according to the present invention, that is, the racemic, optically active and stereoisomeric forms of the diaralkylamine of the Formula I and the nontoxic, pharmacologically acceptable acid addition salts of any of these forms, have useful pharmacodynamic properties. More particularly, they exhibit bronchospasmolytic activities in warm-blooded animals, such as guinea pigs, and are characterized by great stability, especially against oxidative action. Hence, they are administrable to warm-blooded animals perorally as well as parenterally, including by inhalation. Further, they are rapidly and readily absorbed from the gastro-intestinal tract of warm-blooded animals, and maintain a long duration of effective action. Their side effects upon the heart and the blood pressure are very weak, which is particularly noteworthy because known compounds of similar structure produce an undesirable significant side effect upon the heart rate and the blood pressure. More specifically, the compounds of the the present invention produce positive inotropic and positive chronotropic effects on the heart and distinct, although slight, hypotension.

Typical examples of pharmacologically acceptable, non-toxic acid addition salts are their hydrochlorides, hydrobromides, sulfates, phosphates, nitrates, acetates, propionates, butyrates, valerates, oxalates, malonates, succinates, maleates, fumarates, lactates, tartrates, citrates, malates, benzoates, phthalates, cinnamates, salicylates, nicotinates, furoates, 8-chlorotheophyllinates, and the like. The hydrobromides and hydrochlorides, however, are preferred.

For pharmaceutical purposes the compounds of the invention are administered perorally or parenterally as active ingredients in customary dosage unit compositions, that is, compositions in dosage unit form consisting essentially of an inert pharmaceutical carrier and one dosage unit of the active ingredient, such as tablets, hypodermic solutions, inhalation solutions, aerosols, and the like.

The individual dosage unit ranges of the compounds according to the present invention are 0.008–0.5 mgm./kg. bodyweight perorally and 0.0008–0.09 mgm./kg. bodyweight subcutaneously or intramuscularly, and their concentration in inhalation solutions may range from 0.1 to 10% by weight, based on the total weight of the solution.

For instance, the average broncho-spasmolytically effective single dosage range of the stereoisomeric form A of d,l-1-p-hydroxyphenyl-2-($\beta$-3′,5′-dihydroxyphenyl - $\beta$ - hydroxy)-ethyl-aminopropane is 0.008–0.09 mgm./kg. perorally; for administration by the subcutaneous or intramuscular route the average effective single dosage range of the same compound is 0.0008–0.02 mgm./kg. The effective concentration range of the compound in an inhalation solution is from 0.1 to 2% by weight.

The following examples illustrate various dosage unit compositions comprising a compound of the present invention as the active broncho-spasmolytic ingredient. The parts are parts by weight unless otherwise specified.

Example 5

Inhalation aerosol.—The aerosol composition was compounded in customary fashion from the following ingredients:

| | Parts |
|---|---|
| Stereoisomeric Form A of d,l-1-p-hydroxyphenyl-2-($\beta$-3′,5′-dihydroxyphenyl-$\beta$-hydroxy)-ethyl-amino-propane hydrobromide | 0.15 |
| Soybean-lecithin | 0.05 |
| Propellent gas mixture (Frigen 11, 12 and 114), q.s. ad 100.00 parts. | |

A two-second burst of this aerosol from a pressurized aerosol can, when administered through the respiratory tract to warm-blooded animals of about 60 kg. body weight suffering from broncho-spasms, produced very good broncho-spasmolytic effects.

Example 6

Inhalation solution.—The solution was compounded from the following ingredients:

| | Parts |
|---|---|
| Stereoisomeric Form A of d,l-1-p-hydroxyphenyl-2-($\beta$-3′,5′-dihydroxyphenyl-$\beta$-hydroxy)-ethyl-amino-propane hydrobromide | 1.00 |
| Sodium pyrosulfite | 0.05 |
| Disodium salt of E.D.T.A. | 0.05 |
| Distilled water, q.s. ad 100.00 parts. | |

The solution was dispensed through a metered inhalation vaporizer having a spray output capacity of 12.5 liters per minute. When administered by the respiratory route to warm-blooded animals of about 60 kg. body weight requiring broncho-spasmolytic treatment, 1 to 2 metered bursts produced very good broncho-spasmolytic effects.

Example 7

Tablets.—The tablet composition was compounded from the following ingredients:

| | Parts |
|---|---|
| Stereoisomeric Form A of d,l-1-p-hydroxyphenyl-2 - ($\beta$ - 3′,5′ - dihydroxyphenyl - $\beta$ - hydroxy)-ethylamino-propane hydrobromide | 5.0 |
| Corn starch | 55.0 |
| Secondary calcium phosphate | 100.0 |
| Lactose | 30.0 |
| Colloidal silicic acid | 5.0 |
| Stearic acid | 1.0 |
| Soluble starch | 4.0 |
| Total | 200.0 |

The individual ingredients were homogeneously admixed, and the composition was pressed into 200 mgm.-tablets. Each tablet contained 5 mgm. of the ethylamino-propane compound and, when administered by the oral route to warm-blooded animals of about 60 kg. body weight requiring broncho-spasmolytic treatment, produced very good broncho-spasmolytic effects.

Example 8

Hypodermic solution.—The solution was compounded from the following ingredients:

| | Parts |
|---|---|
| Stereoisomeric Form A of d,l-1-p-hydroxyphenyl-2 - ($\beta$ - 3′,5′ - dihydroxyphenyl - $\beta$ - hydroxy)-ethylamino-propane hydrobromide | 0.250 |
| Sodium pyrosulfite | 0.100 |
| Disodium salt of E.D.T.A. | 0.500 |
| Sodium chloride | 8.500 |
| Double-distilled water, q.s. ad 1000.000 by volume. | |

The solution was filled into 1 cc.-ampules, which were then sterilized and sealed. Each ampule contained .25 mgm. of the active ingredient. When administered by the parenteral route to warm-blooded animals of about 60 kg. body weight requiring broncho-spasmolytic treatment, the contents of the ampule produced very good broncho-spasmolytic effects.

While the preceding dosage unit composition examples illustrate only one non-toxic acid addition salt of a stereoisomer of the compound of the present invention as an active ingredient, it should be understood that any of the other forms of the compound embraced by Formula I or a non-toxic, pharmacologically acceptable acid addition salt thereof may be substituted for the single illustrated compound in Examples 5 through 8. Also, the illustrated active ingredient content in these examples may be varied to achieve the above-indicated dosage unit range to meet particular requirements.

Although the present invention has been illustrated with the aid of certain specific embodiments, it will be readily apparent to others skilled in the art that the invention is not limited to these particular embodiments and that various changes and modifications may be made without departing from the spirit of the invention or the scope of the appended claims.

We claim:

1. A broncho-spasmolytic composition in dosage unit form consisting essentially of an inert pharmaceutical carrier and a broncho-spasmolytic amount of a racemic mixture of 1 - p-hydroxyphenyl-2-($\beta$-3′,5′-dihydroxyphenyl-$\beta$-hydroxy)-ethylamino-propane, an optical antipode thereof, a stereoisomer thereof, or a non-toxic, pharmacologically acceptable acid addition salt of said racemic mixture, optical antipode or stereoisomer.

2. A broncho-spasmolytic aerosol composition consisting essentially of an aerosol container, an aerosol propellant and from 0.1 to 10% by weight, based on the total weight of said composition, of a racemic mixture of 1 - p - hydroxyphenyl - 2 - ($\beta$ - 3′,5′ - dihydroxyphenyl-$\beta$-hydroxy)-ethylamino - propane, an optical antipode thereof, a stereoisomer thereof, or a non-toxic, pharmacologically acceptable acid addition salt of said racemic mixture, optical antipode or stereoisomer.

3. The method of relieving broncho-spasms in warm-blooded animals, which comprises administering to said animals an effective broncho-spasmolytic dose of a racemic mixture of 1 - p-hydroxyphenyl-2-($\beta$-3′,5′-dihydroxyphenyl-$\beta$-hydroxy)-ethylamino-propane, an optical antipode thereof, a stereoisomer thereof, or a non-toxic, pharmacologically acceptable acid addition salt of said racemic mixture, optical antipode or stereoisomer.

References Cited

UNITED STATES PATENTS 3,135,797   6/1964   Biel _____ 260—570.6

FOREIGN PATENTS 542,265   4/1956   Belgium.
623,286   7/1961   Canada.
789,033   1/1958   Great Britain.

OTHER REFERENCES

Moed et al., "Rec. Trav. Chim.," vol. 74, pp. 921–24 (1955).

ALBERT T. MEYERS, *Primary Examiner.*

S. FRIEDMAN, *Assistant Examiner.*